INVENTOR
WALTER A. SHIELDS
BY John A. Seifert
ATTORNEY

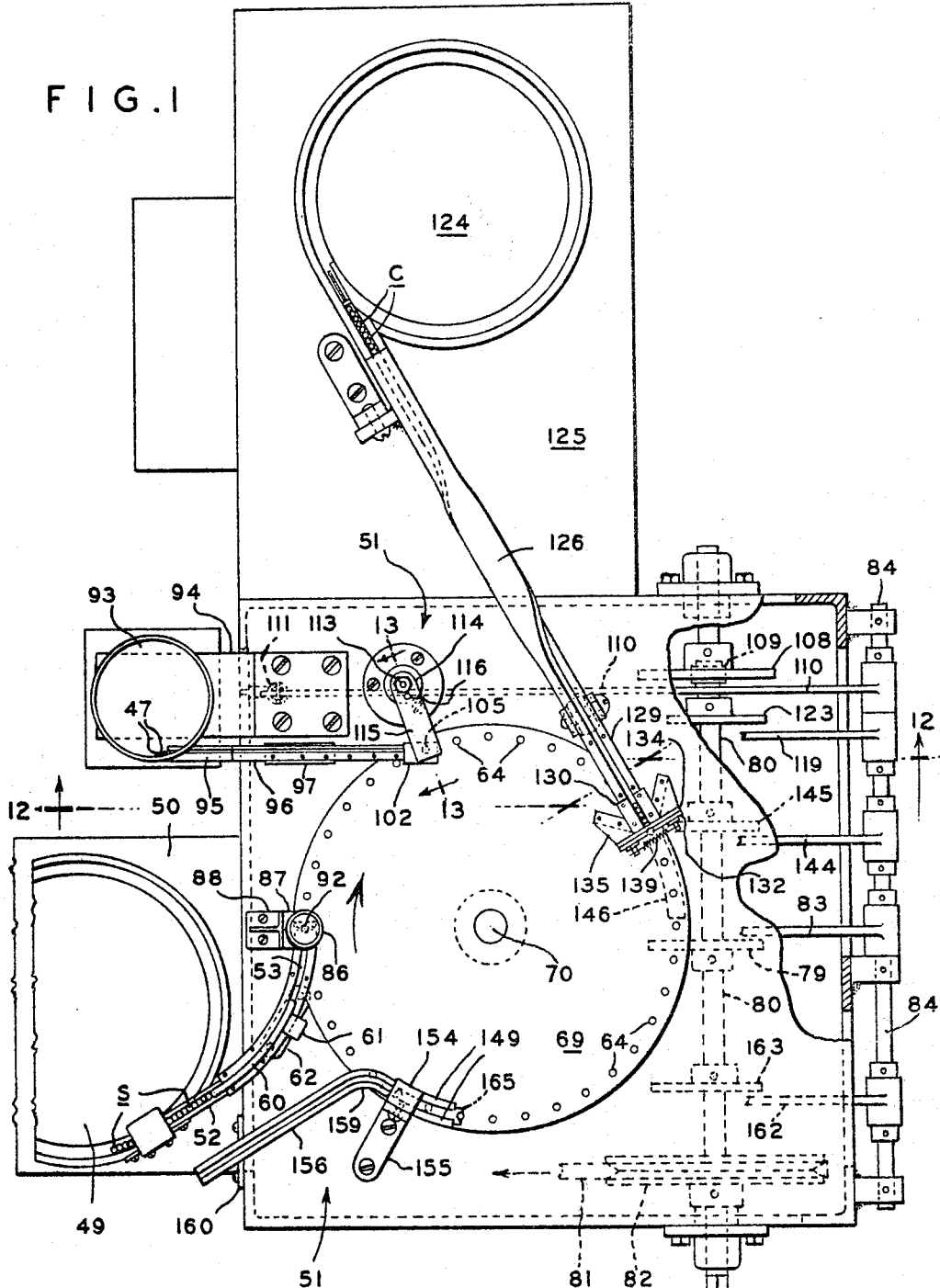

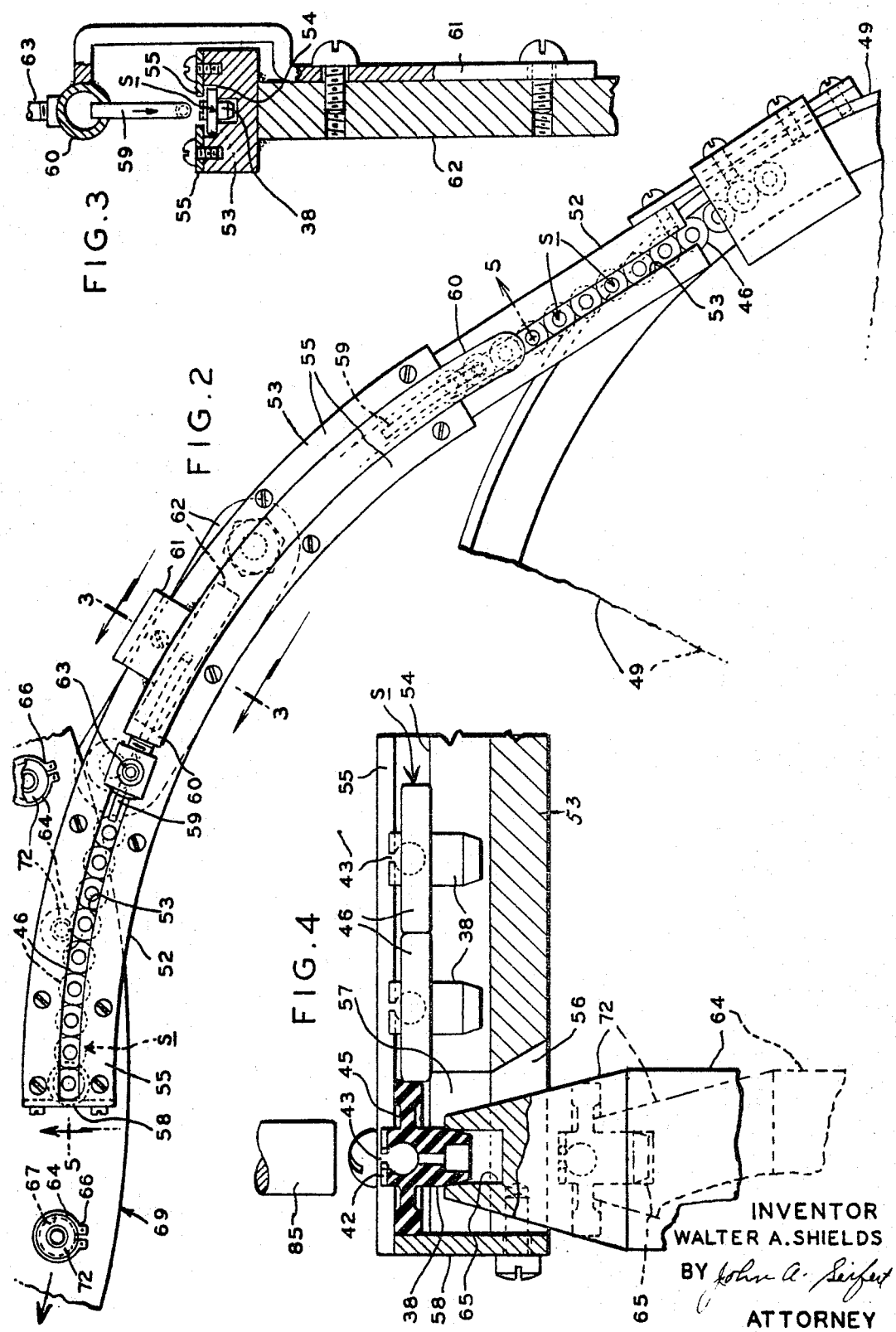

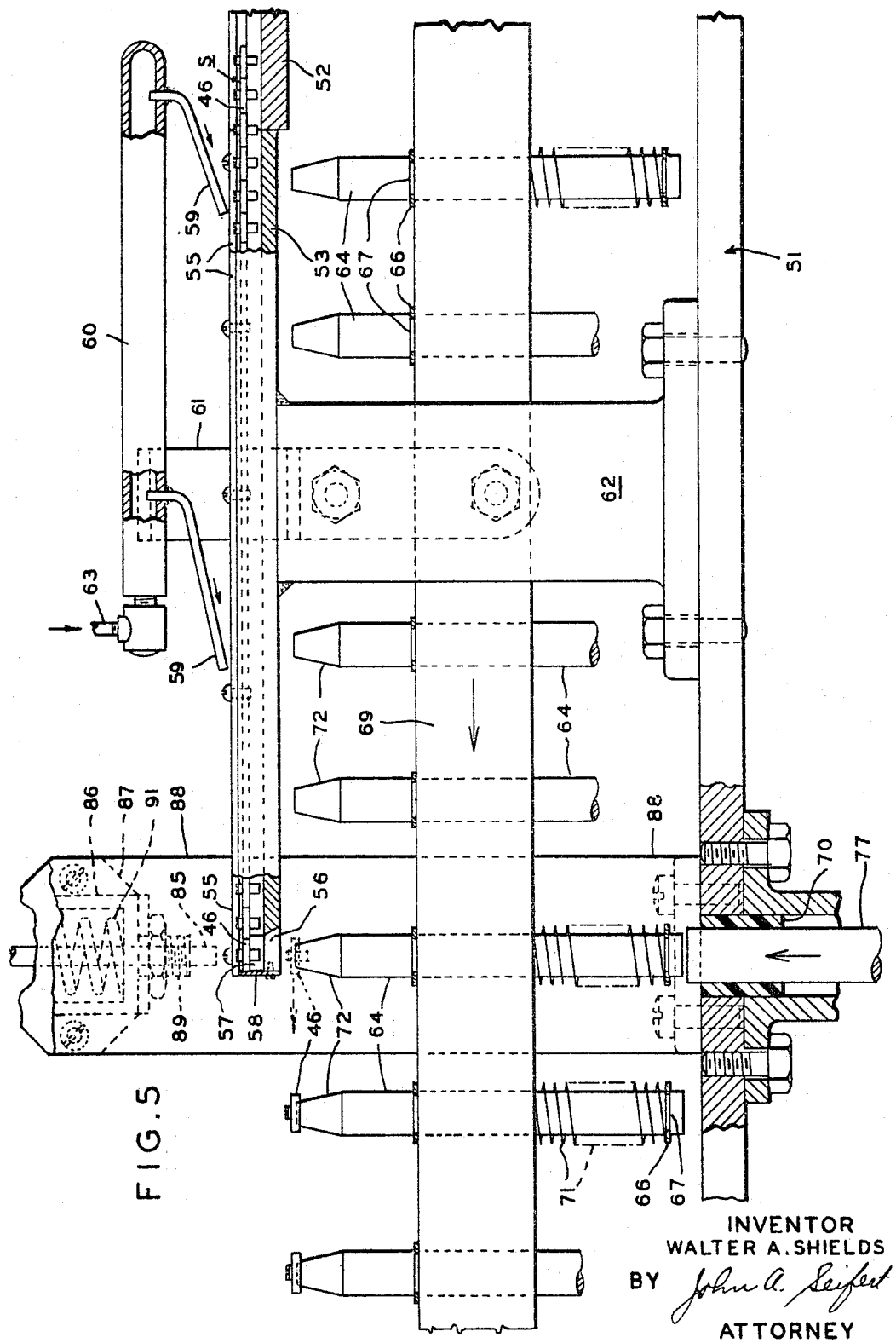

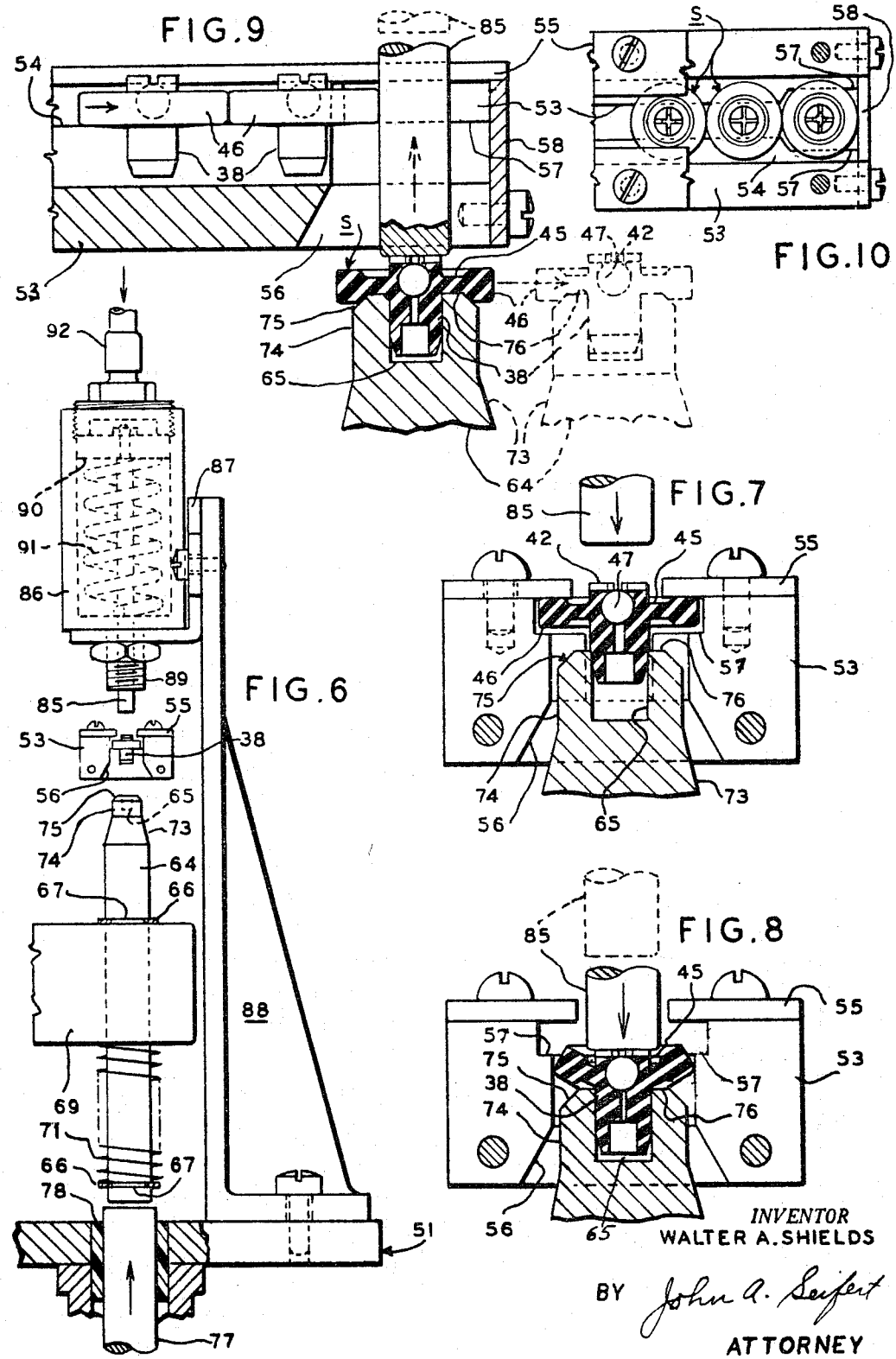

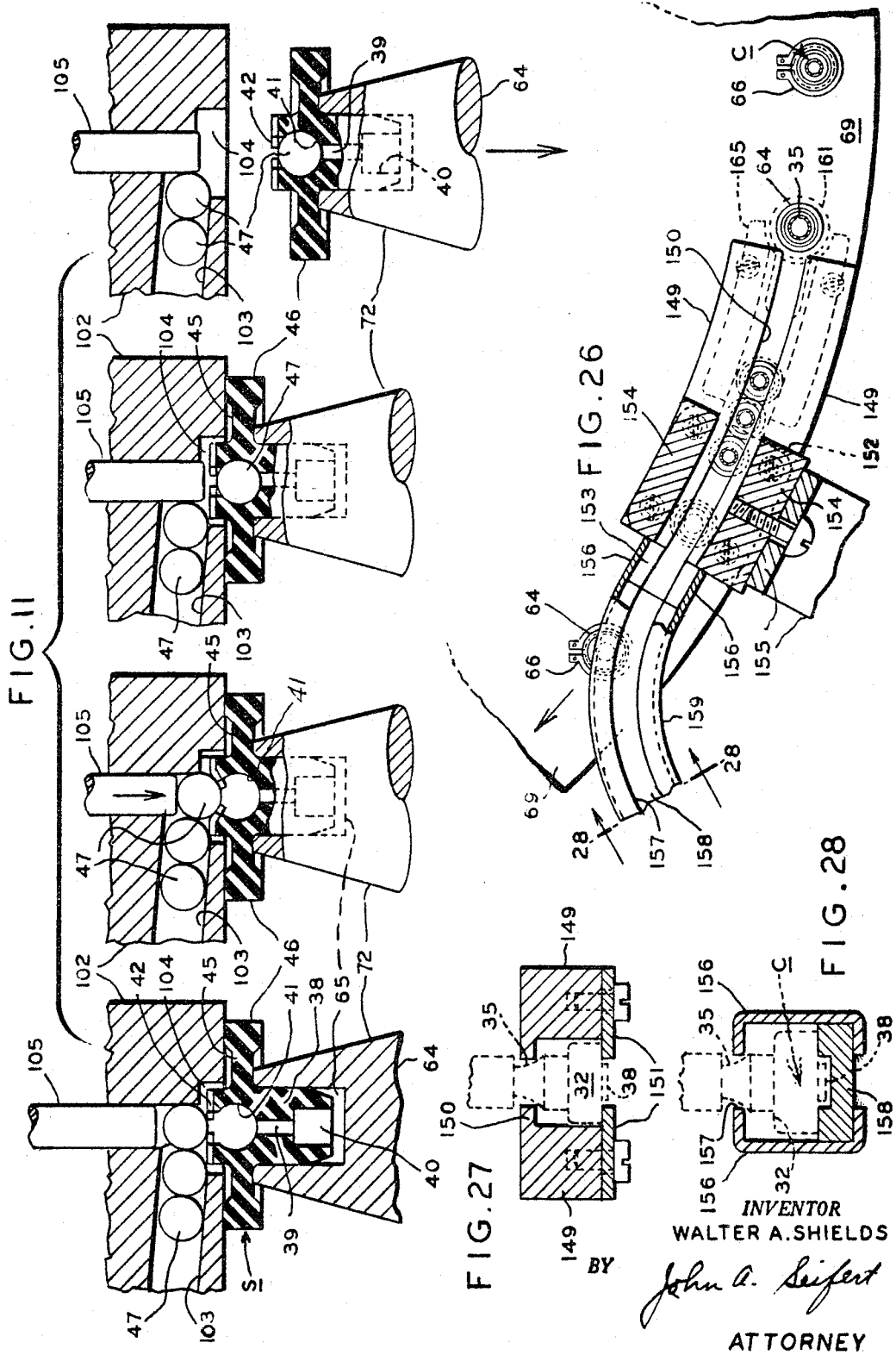

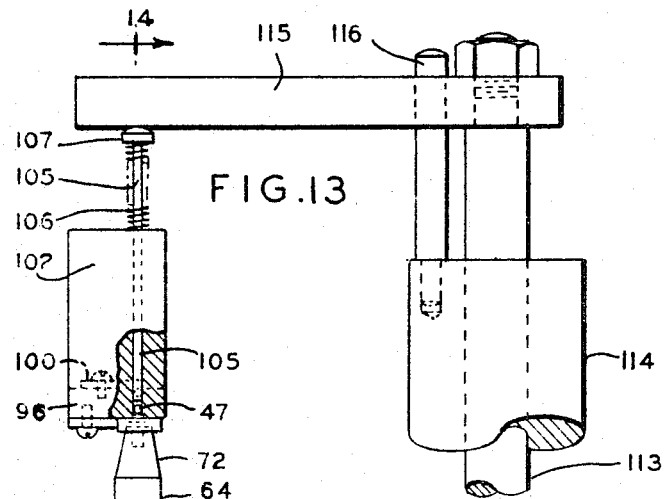
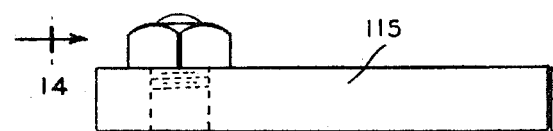
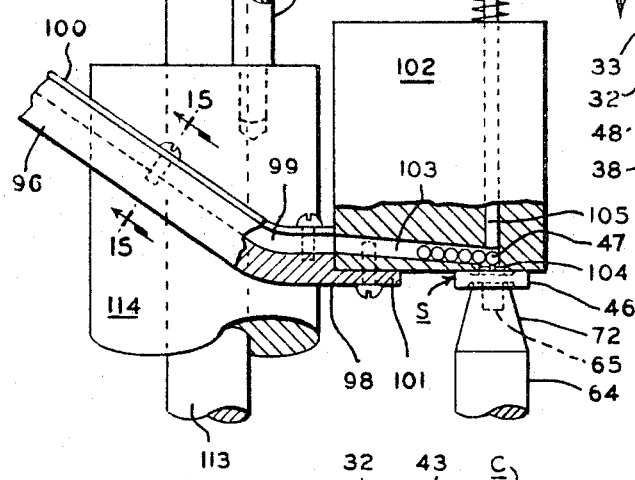
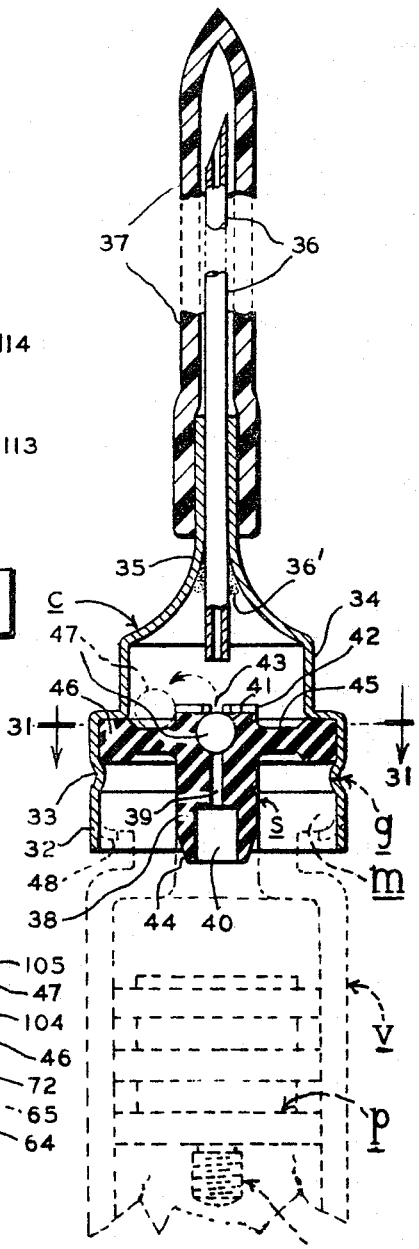
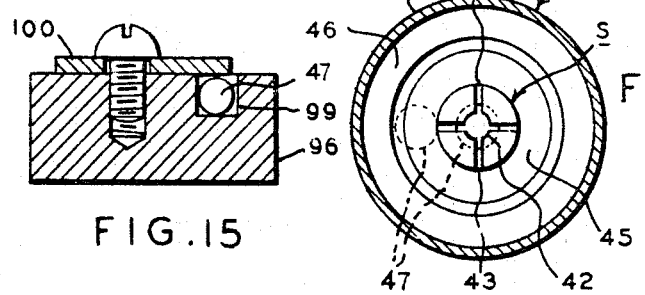
INVENTOR
WALTER A. SHIELDS
BY John A. Seifert
ATTORNEY

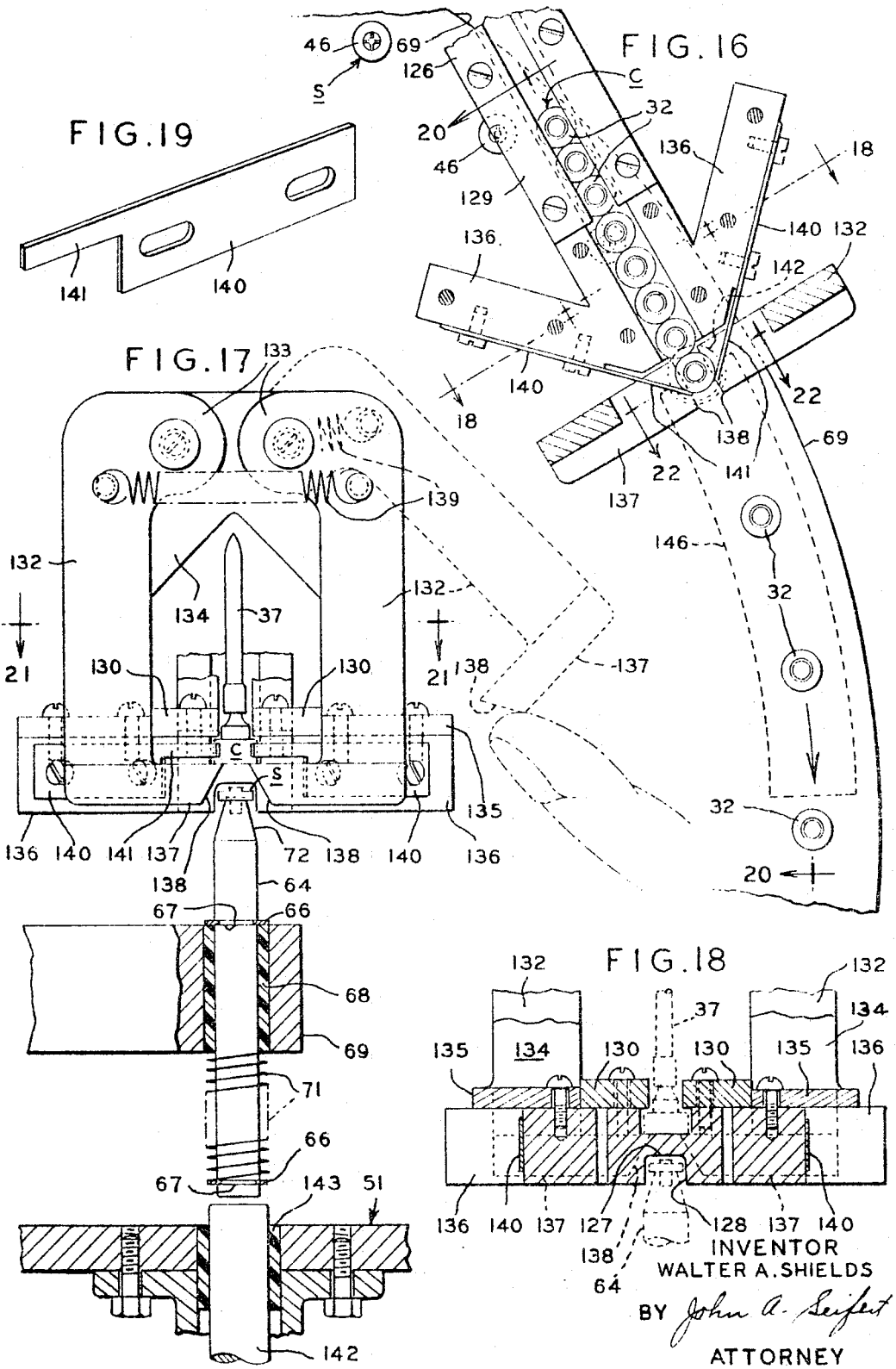

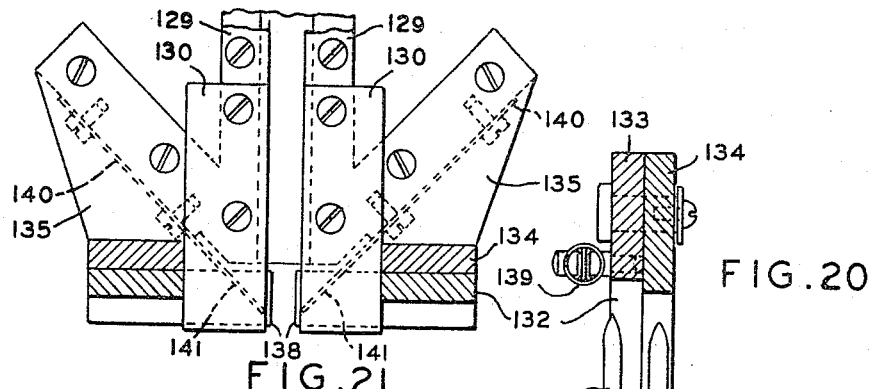
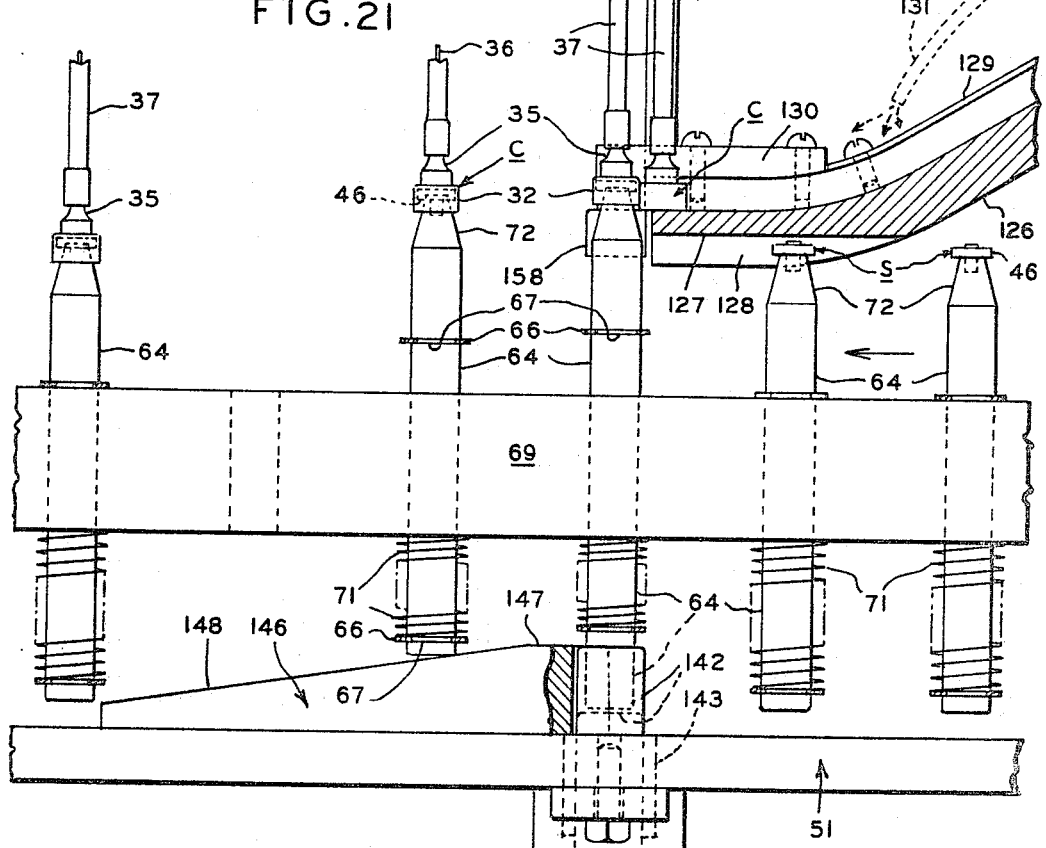
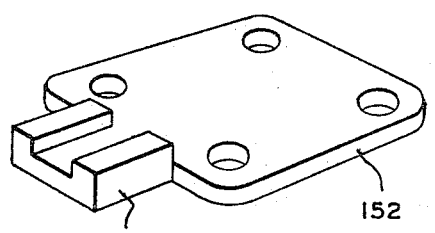

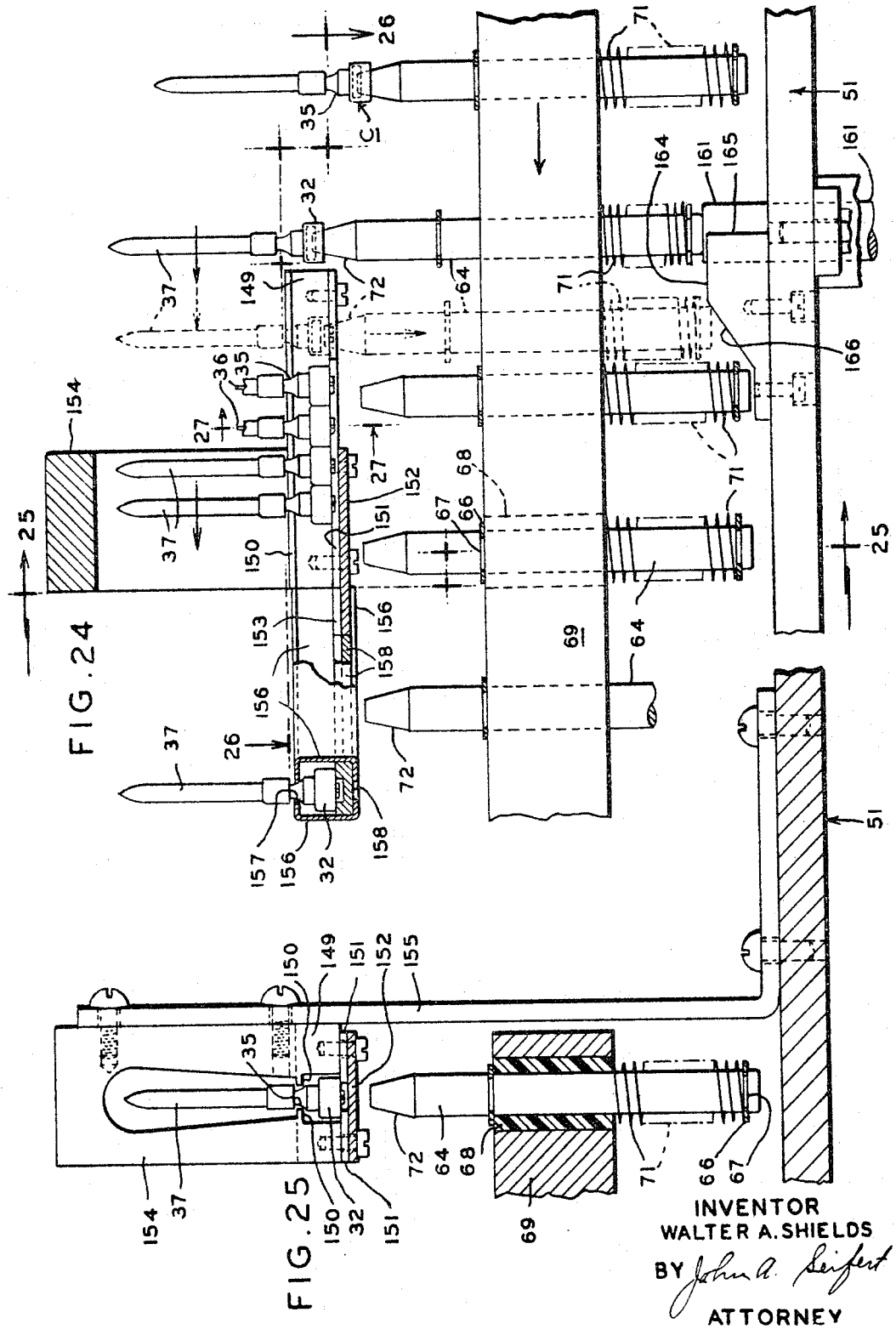

United States Patent Office 3,267,567
Patented August 23, 1966

3,267,567
APPARATUS FOR DELIVERING CLOSURE CAPS AND ASSEMBLING VALVES IN SAID CLOSURE CAPS
Walter A. Shields, Jamaica, N.Y.
(38—09 24th St., Long Island City, N.Y.)
Filed Nov. 19, 1963, Ser. No. 324,800
29 Claims. (Cl. 29—208)

This invention relates to apparatus for assembling valves in closure caps and particularly for assembling ball valves in closure caps having a hypodermic needle mounted in each closure cap and the needle protected by a resilient shield, and said closure cap being crimped to one end of a medicament carrying vial having the opposite end closed by a plunger slidable in said vial toward the capped end to expel the medicament through the needle, the flow of medicament unseating the valve.

It is an object of the invention to provide an apparatus wherein all the steps in assembling the valves in the closure caps are fully automatic and thereby eliminating hand operational steps required by the prior art.

It is another object of the invention to provide a carrier for the valve in the form of a stopper arranged to form a sealing gasket for the closure cap.

It is another object of the invention to intermittently and successively present mandrels below the discharge end of a guideway for a row of stoppers, lifting successive mandrels into partial engagement with the foremost stopper in the guideway, removing the foremost stopper from the guideway and fully inserting said stopper in the mandrel while stopping forward movement of the stoppers in the guideway until the insertion of the foremost stopper in the mandrel is completed.

It is another object of the invention to propel the stoppers along the guideway by jets of fluid pressure.

It is another object of the invention to insert a ball valve in a stopper previously inserted in a mandrel by lifting said mandrel to position the stopper against an exit of a passage in a magazine for said ball valves and subsequently forcing the foremost ball valve into said stopper while restraining further movement of the ball valves in the magazine passage until the foremost ball valve is fully inserted in the stopper and a succeeding mandrel has positioned its stopper against the exit of the magazine passage.

Another object of the invention is to successively deliver closure caps in a row above the path of travel of the mandrels carrying stoppers having valves inserted therein, suspending the foremost closure cap while a mandrel is lifted to move its stopper and valve into the suspended closure cap and subsequently removing the assembled closure cap from the row of closure caps by the forward movement of the mandrel.

A further object of the invention is to remove the assembled closure caps from succeeding mandrels by providing a channel member extending in a horizontal plane higher than the path of travel of the assembled closure caps, successively lifting the mandrels to position the assembled closure caps in a horizontal plane higher than the channel member, moving the lifted closure cap along the channel member, and subsequently lowering succeeding mandrels to remove the assembled closure caps from the mandrels.

Further objects and advantages of the invention will be described hereinafter.

In the drawings accompanying and forming a part of this application:

FIGURE 1 is a top plan view of the apparatus;

FIGURE 2 is a fragmentary top plan view, on an enlarged scale, of means for successively delivering resilient stoppers and means to position said resilient stoppers in successive mandrels;

FIGURE 3 is a cross-sectional view, on an enlarged scale, taken on the line 3—3 of FIGURE 2 looking in the direction of the arrows to show a nozzle for directing a jet of fluid pressure on the stoppers;

FIGURE 4 is an elevational view partly in section and on an enlarged scale showing a mandrel lifted and partly engaging the foremost stopper;

FIGURE 5 is an elevational view partly in section taken substantially on the line 5—5 of FIGURE 2 looking in the direction of the arrows;

FIGURE 6 is a side view of the means for positioning resilient stoppers in successive mandrels showing the parts in neutral position and a modified form of mandrel;

FIGURE 7 is a partial view, on an enlarged scale, of the step of lifting a modified form of mandrel to partially engage a stopper therewith;

FIGURE 8 is a view similar to FIGURE 7 showing a subsequent step of removing the stopper from the guideway and the commencement of the retrograde movement of the mandrel;

FIGURE 9 is a view similar to FIGURE 4 showing the parts in position wherein the stopper is fully positioned in the mandrel and the stopper inserting means at the commencement of its retrograde movement;

FIGURE 10 is a top plan view of the delivery end of the guideway for the stoppers;

FIGURE 11 is a series of views in section showing successive steps of inserting a ball valve in a stopper subsequent to the step of positioning the stopper against the exit of the magazine passage by the supporting mandrel;

FIGURE 13 is an elevational view partly in section, on an enlarged scale, taken on the line 13—13 of FIGURE 1 looking in the direction of the arrows to show the insertion of a ball valve in a stopper;

FIGURE 14 is an elevational view partly in section, on an enlarged scale, taken on the line 14—14 of FIGURE 13 looking in the direction of the arrows;

FIGURE 15 is a sectional view, on an enlarged scale, taken on the line 15—15 of FIGURE 14 looking in the direction of the arrows to show the structure of a chute for the ball valves;

FIGURE 16 is a top plan view, on an enlarged scale, of the delivery end of a chute for closure caps showing means for suspending the foremost closure cap;

FIGURE 17 is a front elevational view of the means for suspending the foremost closure cap;

FIGURE 18 is a cross-sectional view taken on the line 18—18 of FIGURE 16 looking in the direction of the arrows;

FIGURE 19 is a perspective view of a member of a pair of members for retaining the foremost closure cap on the suspending means;

FIGURE 20 is a side elevational view partly in section taken on the line 20—20 of FIGURE 16 looking in the direction of the arrows;

FIGURE 21 is a cross-sectional view taken on the line 21—21 of FIGURE 17 looking in the direction of the arrows;

FIGURE 24 is a side elevational view, on an enlarged scale, of means for removing assembled closure caps from the mandrels;

FIGURE 25 is a vertical-sectional view taken on the line 25—25 of FIGURE 24 looking in the direction of the arrows;

FIGURE 26 is a horizontal-sectional view taken on the line 26—26 of FIGURE 24 looking in the direction of the arrows;

FIGURE 27 is a cross-sectional view taken on the line 27—27 of FIGURE 24 looking in the direction of the arrows;

FIGURE 28 is a cross-sectional view taken on the line 28—28 of FIGURE 26 looking in the direction of the arrows;

FIGURE 29 is a perspective view of a plate forming an intermediate portion of the channel member for removing the assembled closure caps from the mandrels;

FIGURE 30 is a vertical-sectional view of an assembled closure cap showing the manner of applying said closure cap on a vial shown in broken lines and the operation of the valve; and FIGURE 31 is a cross-sectional view taken on the line 31—31 of FIGURE 30 looking in the direction of the arrows.

Figure 12:
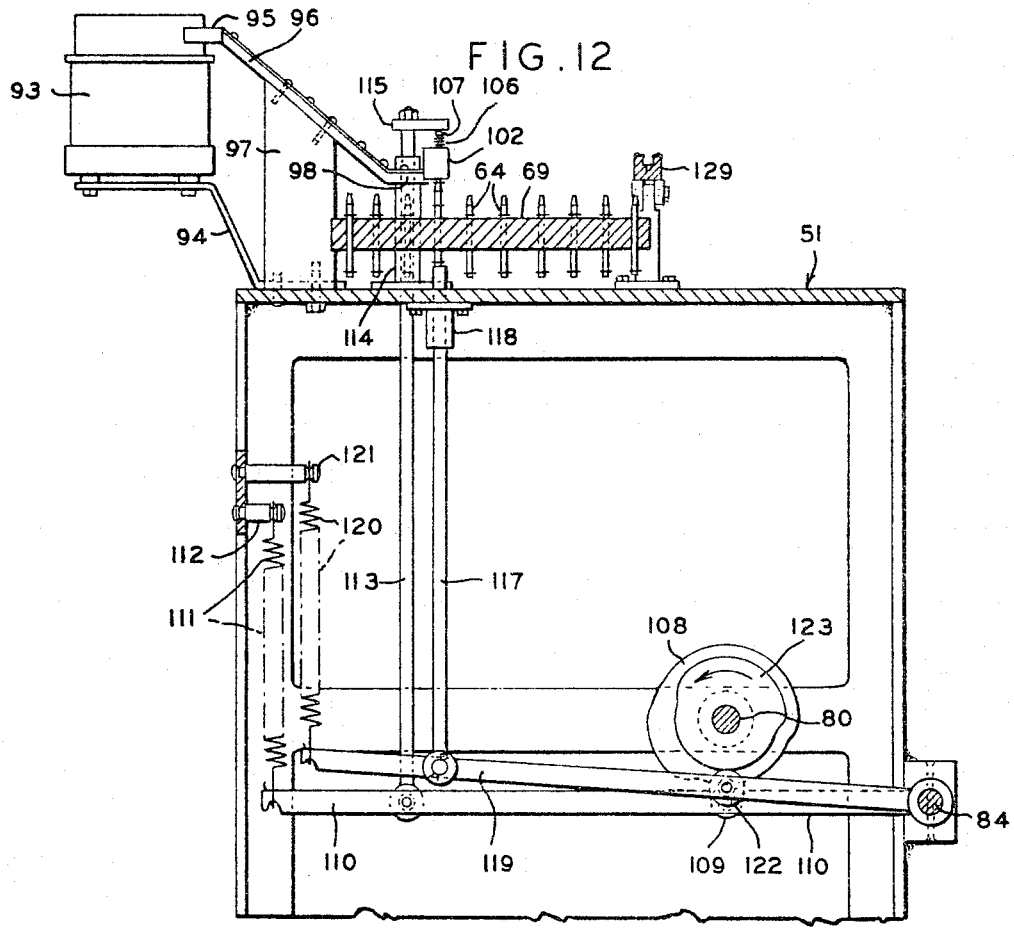
FIGURE 12 is a cross-sectional view taken on the line 12—12 of FIGURE 1 looking in the direction of the arrows and showing the means for inserting a ball valve in successive stoppers supported by the mandrels.

The product produced by the apparatus of this application is shown in FIGURES 30 and 31 as comprising a closure cap $c$ including a skirt portion 32 arranged with an inwardly extending bead 33 in an intermediate portion of the skirt portion 32 and the closed end of the closure cap $c$ provided with a crown portion 34 of smaller diameter than the skirt portion 32 and arranged with a nozzle portion 35 for the mounting therein of a hypodermic needle 36 with the base of the needle extended into the crown portion 34 and secured in the crown portion by a sealing compound 36'. The skin piercing portion of the needle extending from the nozzle 35 is enclosed by a protective shield 37 having one end closed and an open end portion engaged over the nozzle portion 35. A stopper $s$ is secured in the skirt portion 32 and comprises a plug portion 38 having an axial passage 39 terminating at one end in a chamber 40 and at the opposite end in a concave chamber 41. The end of the plug portion 38 arranged with the chamber 41 is provided with a diaphragm 42 closing the chamber 41 and being transversely and diametrically split, as at 43, to form four flexible flaps. The diaphragm is integral with or united to said end of the plug portion 38. The end of the plug portion 38 provided with the chamber 40 is arranged with a beveled face 44. Adjacent to the end of the plug portion 38 provided with the diaphragm 42, there is provided an annular flange 45 integral with the plug portion 38 and the peripheral portion of said annular flange is of increased thickness to snugly fit in an annular groove formed by the bead 33 and the shoulder between the skirt portion 32 and the crown portion 34, as shown at 46. A valve in the form of a ball 47 is inserted in the concave chamber 41 and yieldingly retained therein by the split diaphragm 42.

The assembled closure cap $c$ is adapted to be secured to one end of a vial $v$ filled with a medicament and having the other end closed by a plunger $p$ arranged with a screw-threaded nipple $n$ for attachment of a piston rod of a syringe, not shown, whereby the medicament is forced through the first end of the vial $v$. The first end of the vial $v$ is provided with a beaded mouth $m$ having a concave groove $g$ to receive the bead 33 of the closure cap skirt 32. The assembled closure cap $c$ is engaged on said beaded mouth $m$ by inserting the plug portion 38 into the opening of the beaded mouth $m$ with the peripheral portion 46 abutting the lip of said beaded mouth and the extremity of the skirt portion 32 extending below the beaded mouth. The beveled face 44 will facilitate the insertion of the plug portion 38 into the opening of the beaded mouth $m$. After the closure cap is engaged on the beaded mouth $m$, the closure cap is secured to the beaded mouth by crimping the extremity of the skirt portion 32 under the beaded mouth, as shown in dotted lines 48 in FIGURE 30.

As shown in FIGURE 30, the medicament is expelled from the vial $v$ by pushing the plunger $p$ into the vial forcing the medicament into the chamber 40 through the passage 39 and the pressure of said medicament forcing the ball valve 47 to flex the flaps of the split diaphragm 42 in an outward direction whereby the ball valve 47 is expelled from the concave chamber 41, as indicated in dotted lines, and the medicament is forced into the crown portion 34 and the hypodermic needle 36.

In carrying out the present invention, a supply of stoppers $s$ are placed in a hopper 49 of the vibratory type mounted on a lateral extension 50 of a table 51. The stoppers are vibrated to the periphery of the hopper and discharged through a discharge chute 52 connected to a guideway comprising a channel member 53 having opposed grooves formed by shoulders 54 and plate 55 fixed to the tops of the side portions of the channel member and extended toward each other over the shoulders 54, as shown in FIGURES 2 to 10, inclusive. The width and depth of the channel of the channel member 53 are slightly greater than the diameter and length of the plug portion 38 below the shoulder 45 of the stopper $s$, and the space between the sides of the shoulders 54 is slightly greater than the diameter of the shoulders 45 of the stoppers. The guideway extends in an arcuate direction, as shown in FIGURES 1 and 2, and at the delivery end of the guideway, the bottom wall of the guideway is cut-away to form an opening 56 and the widths of the shoulders 54 are reduced, as shown at 57 in FIGURE 10. The delivery end of the guideway is closed by a vertical plate 58. The stoppers $s$ are propelled along the shoulders 54 toward the plate 58 and opening 56 by jets or fluid pressure, such as air, directed toward predetermined portions of the path of travel of said stoppers in the guideway 53 by nozzles 59 carried by and communicating with a manifold 60 supported by a bracket 61 mounted on a standard 62 secured to the table 51. The standard 62 also supports the guideway 53, as shown in FIGURE 3. The manifold is connected in communication with a source of fluid pressure, such as an air compressor, not shown, by a conduit 63.

The discharge opening 56 is positioned in vertical alignment above the path of travel of a plurality of mandrels in the form of rods 64, each mandrel having an axial recess 65 in one end and a pair of shoulders, each shoulder being a split ring 66 engaged in an annular groove 67 in each mandrel. One of said shoulders 66 being positioned in spaced relation to the end of the mandrel 64 arranged with the recess 65 and the other shoulder being positioned adjacent the opposite end of the mandrel. Before mounting the shoulder rings 66 on the mandrels, the mandrels are slidably engaged in equidistantly spaced openings provided with bushings 68, as shown in FIGURES 17 and 25, and drilled in the peripheral portion of a circular turret 69 secured on a shaft 70 rotatably supported by the table 51, as shown in FIGURE 1, and intermittently rotated by suitable mechanism, not shown. The shoulder 66 spaced from the end of each mandrel 64 arranged with the recess 65 is yieldingly urged against the upper surface of the turret 69 by a spring 71 coiled around each mandrel 64 and compressed between the under surface of the turret and the other shoulder 66. The end of each mandrel arranged with the recess 65 is shown in all views except FIGURES 6 to 10, inclusive, as being of truncated cone shape, as shown at 72, whereas in FIGURES 6 to 10, inclusive, said end of each mandrel is tapered, as at 73, and the extremity is provided with a cylindrical portion 74 having a beveled end 75 extending to a horizontal surface 76 forming the mouth of the recess 65.

The mandrels are successively positioned below the discharge opening 56 with the recessed ends spaced from said opening. The mandrel positioned below the discharge opening 56 is lifted to partially engage the plug portion 38 of the foremost stopper s in the guideway 53 in the recess 65, as shown in FIGURES 4 and 7. This is accomplished by a plunger 77 slidably supported by a bushing 78 in the table 51. The plunger 77 is reciprocated toward and away from the foremost stopper s by a cam disk 79, FIGURE 1, secured on a shaft 80 rotatably supported by the table 51 and continuously rotated by a motor, not shown, connected to the shaft 80 by a belt 81 engaged over a pulley on the motor shaft, not shown, and a pulley 82 secured on the shaft 80. Reciprocal movement is imparted to the plunger 77 from the rotation of the shaft 80 by a lever 83 rotatably mounted at one end on a shaft 84 supported by the table 51 and said lever 83 having a roller, not shown, engaging the periphery of the cam disk 79. The opposite end of the lever 83 is connected to one end of a spring, not shown, having the opposite end anchored to the table 51 whereby the roller of the lever 83 is maintained in contact with the periphery of the cam disk 79. The lower end of the plunger 77 is pivotally connected to an intermediate portion of the lever 83 whereby the pivotal movement of the lever 83 will reciprocate the plunger 77.

Subsequent to the lifting of the mandrel, the foremost stopper s is removed from the guideway 53 by flexing the flange 45 past the shoulders 57 and plug portion 38 of said stopper is fully inserted in the recess 65 of said mandrel. This is accomplished by a plunger 85 reciprocated in alignment with ethe plunger 77 toward and away from the diaphragm 42 of the foremost stopper s. In the present illustration of the invention, the plunger 85 is in the form of a piston rod of a pneumatic operated device comprising a cylinder 86 mounted above the guideway 53 by a bracket 87 secured to a standard 88 supported by the table 51. The lower end portion of the plunger 85 is slidable in a nipple type outlet 89 on the bottom wall of the cylinder 86 and the upper end of the plunger 85 is provided with a piston 90. The plunger 85 is yieldingly urged in an upward direction by a spring 91 compressed in the cylinder 86 between the piston 90 and the bottom wall of said cylinder. The upper wall of the cylinder 86 is provided with a nipple for the connection of a hose, as shown at 92 in FIGURE 6, said hose being connected in communication with a source of pneumatic force, such as an air compressor, not shown, and said source is intermittently connected in communication with the cylinder for predetermined periods of time, whereby subsequent to the lifting of the mandrel 64, the plunger 85 is moved downwardly against the force of the spring 91 into engagement with the diaphragm 42 of the foremost stopper s and the continued downward movement of the plunger 85 will force the peripheral portion 46 of the flange 45 past the shoulders 57 and fully engage the plug portion 38 of the foremost stopper s in the recess 65 of the aligned mandrel 64, as shown in FIGURE 8. During the downward movement of the plunger 85 to fully engage the plug portion 38 in the recess 65, the plunger 77 is moved in a downward direction by the cam 79, as shown in FIGURE 8, and said downward movement of the plunger 77 is continued while initial upward movement is imparted to the plunger 85 by the spring 91, as shown in FIGURE 9. Finally, the plunger 77 is moved out of contact with the bottom of the aligned mandrel 64 to permit the spring 71 to position the upper shoulder 66 against the upper surface of the turret 69 and the plunger 85 is moved out of the guideway 53 to permit the succeeding stopper s to move in vertical alignment with the discharge opening 56. During the removal of the foremost stopper s from the guideway shoulders 57 and the full insertion of the stopper plug portion 38 in the mandrel recess 65, the succeeding stopper s is held out of alignment with the discharge opening 56 by the plunger 85, as shown in FIGURE 9.

When retrograde movements of the plungers 77 and 85 have been completed, the turret 69 is actuated to move the mandrel having the stopper inserted therein out of alignment with the plungers 77 and 85 and position the succeeding mandrel in alignment with said plungers 77 and 85 to have a stopper s inserted in its recess 65 by repeating the operations of the plungers 77 and 85.

After a stopper s is inserted in the recess 65 of a mandrel 64, said mandrel is intermittently moved in a clockwise direction, as indicated by the arrow in FIGURE 1, to a station where the valve 47 is inserted in the concave chamber 41 below the diaphragm 42, as shown in FIGURES 1 and 11 to 15, inclusive. The valves 47 are successively delivered to this station from a vibratory hopper 93 mounted above the horizontal path of movement of the turret by a bracket 94 supported by the table 51, as shown in FIGURES 1 and 12. The valves 47 are discharged from a peripheral portion of the hopper through a discharge guideway 95 extending from said peripheral portion in a horizontal plane and discharging successive valves 47 into a chute 96 supported in a declining plane by a bracket 97 mounted on the table 51. The lower portion of the chute 96 extends in a horizontal plane, as shown at 98 in FIGURES 12 and 14. The chute 96 is formed of a solid piece having a longitudinal groove 99 in the upper surface and closed by a plate 100 secured to the solid piece to retain the valves 47 in the groove 99, as shown in FIGURE 15. The upper portion of the extremity of the horizontal chute portion 98 is cut-away, as at 101 in FIGURE 14, for the mounting of a magazine 102 having a passage 103 declining from an entrance communicating with the discharge end of the groove 99 to an exit 104 in the bottom of the magazine 102 and in vertical alignment wtih a mandrel 64 having a stopper s positioned in the recess 65 of said mandrel. The foremost valve 47 in the passage 103 is normally retained out of the exit 104 by a plunger 105 slidably mounted in the magazine 102 in vertical alignment with the exit and the lower end of the plunger 105 is yieldingly positioned out of the passage 103 by a spring 106 compressed on a portion of the plunger 105 projecting from the top of the magazine and between a head 107 on the projecting end of the plunger and the top of the magazine 102. The plunger 105 is actuated against the force of the spring 106 to move the lower end of the plunger into the exit 104. This is accomplished by a cam disk 108 secured on the shaft 80 and engaging a roller 109 on an intermediate portion of a lever 110 pivoted at one end on the shaft 84 and the opposite end connected to one end of a spring 111 having the opposite end anchored to a post 112 fixed in the table 51, as shown in FIGURE 12. A portion of the lever 110 between the roller 109 and the spring 111 is pivotally connected to one end of a rod 113 slidably mounted in an elongated bearing 114 supported on the top of the table 51. The upper portion of the rod 113 is extended above the bearing 114 and is provided with an arm 115 slidable on a guide pin 116 fixed in the bearing 114, as shown in FIGURES 13 and 14. The arm 115 is extended laterally from the rod 113 to abut the plunger head 107 so that the rotation of the cam disk 108 will move the rod 113 in a downward direction against the force of the spring 111 and the plunger 105 in a downward direction against the force of the spring 106 to move the lower end of the plunger 105 past the passage 103 to the exit 104.

When a mandrel 64 having a stopper s in the recess 65 of said mandrel is positioned in vertical ailgnment with the exit 104 of the magazine 102, the lower end of the plunger 105 has been actuated by the cam disk 108 to the position shown in the extreme right hand view of FIGURE 11. Before the plunger 105 is permitted by the cam disk 108 to be lifted by the spring 106 out of the path of travel of the valves 47 in the passage 103, the mandrel 64 is lifted to position the diaphragm 42 in the exit 104. This is accomplished by a plunger 117 having the upper portion slidable in a bearing 118 on the table 51 and the lower end pivotally connected to an intermediate portion of a lever 119 pivoted at one end on the shaft 84 and the opposite end connected to one end of a spring 120 having the opposite end anchored to a post 121 fixed in the table 51, as shown in FIGURE 12. A roller 122 is mounted on the lever 119 between the plunger 117 and the shaft 84 to engage the cam edge of a disk 123 secured on the shaft 80. The plunger 117 is slidably mounted in vertical alignment with the mandrel 64 positioned by the turret 69 in vertical alignment with the magazine exit 104. The cam edges of the disks 108 and 123 are disposed so that the plunger 105 is positioned in the passage 103 to prevent movement of the foremost valve 47 into the exit 104 while the plunger 117 is actuated in an upward direction under the influence of the spring 120 to position the diaphragm 42 in the exit 104.

The plunger 117 is maintained in this actuated position while the rod 113 is permitted by the cam disk 108 to be raised by the spring 111 which will allow the plunger 105 to be actuated in an upward direction by the spring 106 to position the lower portion of said plunger 105 out of the path of travel if the aforemost valve 47 to permit said valve to enter the magazine exit 104 into contact with the diaphragm 42 of the stopper s, as shown in the extreme left hand view of FIGURE 11 and in FIGURE 14.

Subsequent to the positioning of the foremost valve 47 in contact with the diaphragm 42, the cam disk 108 will actuate the lever 110 to lower the rod 113 and move the plunger 105 downward against the force of the spring 106 to move the foremost valve 47 past the diaphragm 42 and into the concave chamber 41 of the stopper s, as shown in the center left hand view of FIGURE 11. Under the continued rotation of the cam disk 108, the plunger 105 is moved further downward to push the valve 47 completely into the concave chamber 41 which will permit the diaphragm 42 to assume its normal valve retaining position, as shown in the center right hand view of FIGURE 11.

After the valve 47 is fully inserted in the stopper chamber 41, the plunger 105 remains in its valve inserting position and the plunger 117 is lowered by the cam disk 123 against the force of the spring 120, as shown in the extreme right hand view of FIGURE 11, which is the same position as the initial position of parts at the commencement of the valve inserting operation.

Subsequent to the insertion of the valve 47 in the stopper s, the turret 69 is intermittently actuated to successively position the mandrels carrying the combined valves 47 and stoppers s to means to deliver successive closure caps c to be assembled on the stoppers s, as shown in FIGURES 1 and 16 to 23, inclive. The closure caps c, as previously described in connection with FIGURES 30 and 31, are delivered from a vibratory hopper 124 supported in elevated position by a platform 125 extended laterally from the table 51, as shown in FIGURE 1. The closure caps are delivered from a peripheral portion of the hopper 124 by a chute 126 declining from the hopper with the lower portion extended in a horizontal plane, as shown at 127 in FIGURE 20, and having the bottom surface grooved, as at 128 in FIGURES 18 and 20, to permit the normal travel of the mandrels carrying the combined stoppers and valves on the turret 69. The cross-section of the chute 126 at the lower section of the declining portion is of channel shape to receive the skirt portions 32 of the closure caps c with flanges 129 extending from the tops of the side walls of the channel and partly over the channel in a horizontal plane above the shoulders on top of the cap skirt portions 32 and on opposite sides of the cap crown portions 34 to retain the closure caps c in vertical position on the chute. The horizontal portion 127 of the chute is also of channel shape in cross-section with flanges 130 on the tops of the side walls of the channel and the forward end portions extended beyond the front end of the horizontal portion 127, as shown in FIGURES 20 and 21. To facilitate forward movement of the closure caps c in the channel of the horizontal chute portion 127, a jet of pneumatic pressure, such as compressed air, is projected on the juncture between the declining and horizontal chute portions by a nozzle 131 connected to a source of pneumatic pressure, such as an air compressor, not shown. The foremost closure cap c in the horizontal portion 127 is permitted to leave said portion 127 and is suspended above a mandrel 64. This is accomplished by a pair of levers 132 having lateral ears 133 at one end pivotally mounted on the connecting portion of a U shaped bracket 134 having the leg portions arranged with wing shaped bases 135, FIGURES 17, 18 and 21, secured to wing portions 136 projecting from the horizontal chute portion 127, FIGURES 16, 17 and 18. The opposite ends of the levers 132 are provided with horizontal portions 137 extending toward each other and the extremities beveled and spaced apart from each other, as shown at 138 in FIGURES 17, 18, 22 and 23. Said ends 138 are urged toward each other by a spring 139 having the ends anchored to the levers 132, as shown in FIGURES 17 and 20. The ends 138 are maintained in spaced relation by the levers 132 abutting the flanges 130, as shown in FIGURES 17 and 18. The upper faces of the lever portions 137 are substantially in the horizontal plane of the bottom of the channel of the horizontal chute portion 127 and the spaced ends 138 of said lever portions 137 are of increased width so that said ends 138 are adjacent to the discharge end of the horizontal chute portion 127, as shown in FIGURES 16, 20 and 21. The foremost closure cap c is retained on the ends 138 of the lever portions 137 by a pair of stops comprising plates 140 secured to the chute wing portions 136, as shown in FIGURES 16, 17 and 21, and having end portions 141 of reduced width extended over the ends 138 of the lever portions 137 with the ends of said reduced portions 141 spaced from each other. The plates 140 are of resilient material so that the foremost closure cap is capable of being forced past said end portions 141. The beveled ends 138 will permit the stoppers s to pass between said ends in the normal path of travel of the mandrels 64, as shown in FIGURES 17 and 18.

Figures 22, 23:
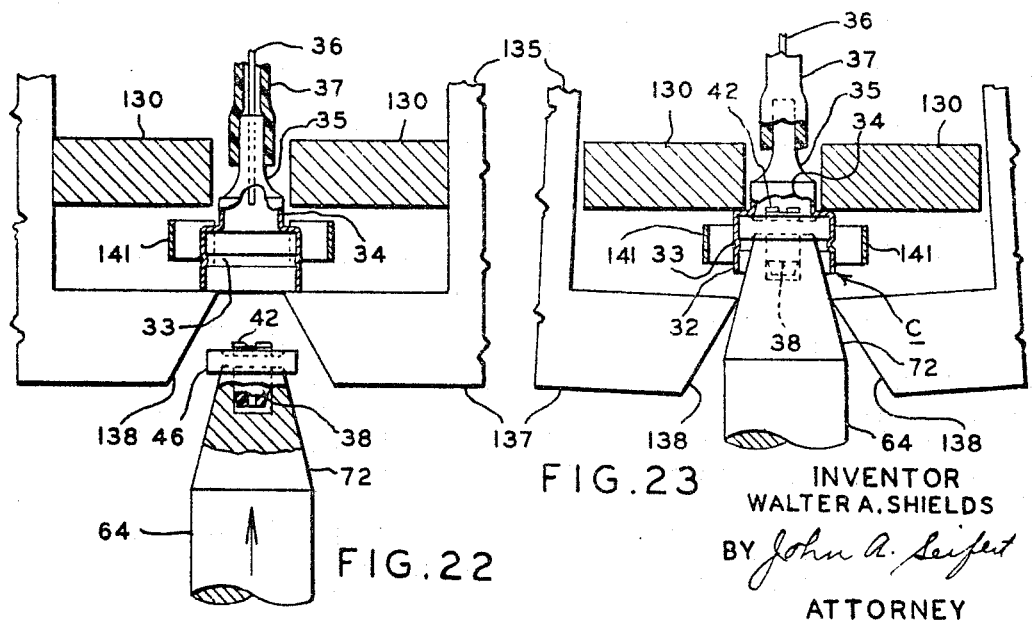
FIGURE 22 is a cross-sectional view, on an enlarged scale, taken on the line 22—22 of FIGURE 16 looking in the direction of the arrows.
FIGURE 23 is a view similar to FIGURE 22 showing the mandrel moving the closure cap suspending means apart and inserting the valve containing stopper into the suspended closure cap.

The mandrel positioned in vertical alignment below the closure cap supported by the lever portions 138 is lifted to move the stopper s past the lever ends 138 and insert said stopper into the skirt portion 32 above the bead 33 of the closure cap supported by the lever ends 138. The lifting of said mandrel causes the tapered portion 72 or 73 to engage the beveled ends 138 and pivot the levers 132 away from each other against the force of the spring 139, as shown in FIGURE 23. Said mandrel is lifted by a plunger 142 slidably mounted in a bushing 143 in the table 51, as shown in FIGURE 17, and said plunger having the lower end pivotally connected to an intermediate portion of a lever 144 having one end pivoted on the shaft 84 and the opposite end of said lever yieldingly urged in an upward direction by a spring, not shown, anchored and connected to the lever 144 in the same manner as the springs 111 and 112 shown in FIGURE 12. Said spring yieldingly urges a roller, not shown, mounted on the lever 144 in the same manner as the rollers 109 and 122 in FIGURES 1 and 12, in contact with the cam periphery of a disk 145 secured on the shaft 80. The disk 145 normally positions the upper end of the plunger 142 above the top of the table 51 and out of the path of travel of the lower ends of the mandrels, as shown in FIGURE 17. During the rest periods of the turret 69, the plunger 142 is actuated by the cam disk 145 to lift a mandrel having its stopper s between the lever ends 138 against the force of the spring 71 to insert said stopper *s* into the closure cap *c* supported by said lever ends 138, as shown in FIGURES 20 and 23. The closure cap *c* having the stopper assembled therein is removed away from the lever ends 138 and out of the retaining engagement of the stop portions 141 by the succeeding intermittent movement of the turret 69. To facilitate said removal, the mandrel having said assembled closure cap is temporarily retained in its lifted position by a ramp 146 mounted on top of the table 51 succeeding the plunger 142 in the direction of travel of the turret 69 and having a horizontal surface 147 extending level with the top of the plunger 142 in its uppermost position and having a surface 148 declining from the horizontal surface 147 to a horizontal plane substantially in the path of travel of the lower ends of the mandrels, as shown in FIGURE 20.

After the mandrels carrying the assembled closure caps are conveyed by the turret 69 past the ramp 146, they are successively presented to means for removing the assembled closure caps from the mandrels and delivering the assembled closure caps to a depository or to apparatus for crimping the assembled closure caps to the vials *v*. This means is shown in FIGURES 1 and 24 to 29, inclusive, as comprising a channel member including a receiving end consisting of a pair of spaced rails 149 having at the tops flanges 150 extending toward each other and spaced a distance apart slightly greater than the diameter of the nozzle portion 35 of the closure caps *c* to prevent upward displacement of the assembled closure caps. The bottoms of the rails 149 are provided with flanges in the form of plates 151 secured to said bottoms and spaced a distance apart to engage the bottom edges of the skirt portions 32 of the assembled closure caps without touching the ends of the plug portions 38 arranged with the chambers 40, as shown in FIGURE 27. An intermediate portion of the channel member succeeding the receiving portion 149 in the direction of travel of the mandrels comprises a plate 152 having at one end a grooved portion 153 with the side walls extending higher than the plate, FIGURE 29. Said plate 152 is secured to the ends of leg portions of an inverted U-shaped member 154 mounted on a bracket 155 supported by the table 51. The opposing faces of the legs of the U-shaped member 154 are arranged to carry or form continuations of the rails 149 with the flanges 150 and 151. The plate 152 is extended in a horizontal plane below the horizontal plane of the flanges 151 with the grooved portion 153 extending as a continuation of the flanges 151, as shown in FIGURE 24. The grooved portion 153 extends from the end of the plate 152 remote from the rails 149 constituting the receiving end of the channel member. The discharge end of the channel member comprises a pair of spaced parallel U-shaped rails 156 with the legs of the U extending in horizontal planes and the legs of one rail spaced from the legs of the other rail to form a slot 157 at the top for the passage of the nozzle portions 35 of the closure caps *c*. One end of the lower leg of each rail 156 is engaged over the grooved portion 153 and secured thereto, as by welding. The lower leg of each rail 156 also supports a grooved member 158 secured to the rails 156, as by welding, and extended as a continuation of the grooved portion 153. The rails 156 are curved, as at 159, to direct said rails to a side of the table 51 where they are supported by a bracket 160, as shown in FIGURE 1.

Preceding the entrance to the receiving end 149–151 of the channel member, the mandrels 64 carrying the assembled closure caps are lifted to position the bottom of the skirt portions 32 in a horizontal plane higher than the horizontal plane of the flanges 151, as shown in FIGURE 24. This is accomplished by a plunger 161 having the upper portion slidably supported in the table 51 and the lower end of said plunger is pivotally connected to an intermediate portion of a lever 162 pivoted at one end on the shaft 84. A portion of the lever 162 between the plunger 161 and the shaft 84 is provided with a roller, not shown, engaging the cam periphery of a disk 163 secured on the shaft 80, FIGURE 1, and said roller is yieldingly urged into engagement with the disk cam 163 by a spring, not shown, attached to the opposite end of the lever 162 and anchored to the table 51 in the same manner as the levers 110 and 119 shown in FIGURE 12. During the rest periods of the turret 69, the cam 163 actuates the plunger 161 in an upward direction to lift a mandrel aligned with said plunger. During the next intermittent movement of the turret 69, said aligned mandrel is moved from the raised plunger 161 onto a horizontal surface 164 of a ramp 165 secured to the top of the table 51 and having a surface 166 declining from the horizontal surface 164. The portion of the ramp 165 arranged with the horizontal surface 164 is extended partially around the lifted plunger 161, as shown in FIGURES 24 and 26. As the lower end of the aligned mandrel moves from the horizontal surface 164 to the declining surface 166, said mandrel is forced in a downward direction by the spring 71 to position the bottom of the skirt portion 32 of the closure cap *c* carried by said mandrel onto the flanges 151. When the lower end of the mandrel leaves the declining surface 166 of the ramp 165, the assembled closure cap has been removed from the mandrel and said closure cap is advanced along the flanges 151 by the intermittent travel of the mandrels 64 delivering assembled closure caps to the channel member portion 149–151.

After the assembled closure caps are removed from the mandrels, said mandrels are again presented to the plungers 77 and 85 and the discharge opening 56 to insert stoppers *s* in the recesses 65 of said mandrels.

The lever 83 connected to the plunger 77 is arranged and actuated in the same manner as the levers 110 and 119 in FIGURE 12.

Having thus described my invention, I claim:

1. In apparatus for assembling valves in closure caps, a plurality of mandrels equidistantly spaced from each other, slidably mounted in vertical planes and intermittently moved in unison in a horizontal plane, means for successively delivering resilient stoppers in a horizontal plane above the path of travel of the mandrels, means to position said resilient stoppers in successive mandrels to be supported by the mandrels, means to insert a valve in successive stoppers supported by the mandrels, means to deliver successive closure caps in a horizontal plane above the path of travel of the mandrels, means to lift successive mandrels and insert the stoppers supported by said mandrels into successive closure caps, and means to remove the assembled closure caps from the mandrels.

2. In apparatus for assembling valves in closure caps as claimed in claim 1, a turret rotatable on a vertical axis and intermittently actuated, and the mandrels slidably mounted in said turret.

3. Apparatus for assembling valves in closure caps as claimed in claims 2, wherein each mandrel is provided with a pair of shoulders, the first shoulder being adapted to abut the upper surface of the turret and the second shoulder positioned below the turret, and a spring compressed on each mandrel between the second shoulder and the turret to normally abut the first shoulder against the upper surface of the turret.

4. Apparatus for assembling valves in closure caps as claimed in claim 1, wherein each of the resilient stoppers comprises a plug portion, an annular flange portion adjacent the upper end of the plug portion, and the plug portion being provided with an axial passage having chambers at the opposite ends and the upper chambers constituting a valve seat.

5. Apparatus for assembling valves in closure caps as claimed in claim 4, wherein the upper end of each mandrel is provided with a recess to receive the plug portion of the stopper.

6. Apparatus for assembling valves in closure caps as claimed in claim 4, wherein the annular flange of the stopper is provided with a peripheral portion of increased thickness to form a sealing gasket for the closure cap.

7. Apparatus for assembling valves in closure caps as claimed in claim 1, wherein the means for successively delivering resilient stoppers comprises a hopper for the resilient stoppers, a guideway extending from the hopper to the path of travel of the mandrels, and nozzles mounted above the guideway and connected in communication with a supply of pneumatic pressure to propel the stoppers along the guideway.

8. Apparatus for assembling valves in closure caps as claimed in claim 1, wherein the means to position the resilient stoppers in successive mandrels comprises a plunger mounted above the foremost resilient stopper in the delivering means and actuated toward and away from said delivering means to transfer said foremost stopper from the delivering means to a mandrel below the foremost stopper, and means to lift said mandrel below the foremost stopper and engage said mandrel with said stopper prior to the engagement of said stopper by the plungr.

9. Apparatus for assembling valves in closure caps as claimed in claim 8, wherein the means to lift said mandrel comprises a second plunger reciprocally mounted below the path of travel of the mandrels in vertical alignment with the first pulnger and actuated toward and away from the bottom of said mandrel.

10. Apparatus for assembling valves in closure caps as claimed in claim 9, wherein the resilient stopper comprises a plug portion and an annular flange portion adjacent to the upper end of the plug portion, the upper end of each mandrel is provided with an axial recess to receive the plug portion below the annular flange portion, the means for successively delivering resilient stoppers comprises a guideway including a pair of spaced parallel rails extending in a horizontal plane above the tops of the mandrels in their normal path of travel and arranged with opposed grooves for the engagement of the annular flange portions of the resilient stoppers, the initial movement of the second plunger partially inserting the plug portion of the foremost stopper into the recess of the mandrel, the first plunger being subsequently actuated into engagement with the plug portion above the annular flange portion of the foremost resilient stopper, and the continued actuation of the first plunger toward the foremost stopper forcing the annular flange portion of said foremost stopper from the grooves of the parallel rails and inserting the plug portion below the annular flange portion fully into the recess of the mandrel, and subsequently to said full engagement of said plug portion in the mandrel recess retrograde movement is imparted to the second plunger to return the mandrel to its normal position of travel.

11. Apparatus for assembling valves in closure caps as claimed in claim 1, wherein the means to insert a valve in successive stoppers supported by the mandrels comprises a magazine mounted above the path of travel of the mandrels and arranged with a passage having an entrance and exit and declining from the entrance to the exit to deliver successive valves in a row to the exit, said exit being in vertical alignment with the path of travel of the mandrels, and a plunger slidably mounted in the mandrel in vertical alignment with the exit of the passage and yieldingly positioned out of said exit and actuated toward the leading valve in the magazine passage to insert said valve in a stopper supported by a mandrel in vertical alignment below the exit of the magazine passage.

12. Apparatus for assembling valves in closure caps as claimed in claim 11, a hopper for the valves having a discharge positioned in a horizontal plane above the magazine, and a chute connected at one end in communication with the discharge of the hopper and the opposite end of the chute connected in communication with the entrance to the magazine passage.

13. Apparatus for assembling valves in closure caps as claimed in claim 12, wherein the valves comprises balls, and the passage in the magazine is circular in cross-section.

14. Apparatus for assembling valves in closure caps as claimed in claim 13, wherein each of the resilient stoppers comprises a plug portion, an annular flange portion adjacent the upper end of the plug portion and the plug portion being provided with an axial passage having chambers at the opposite ends and the upper chamber being concave corresponding to the size and shape of the ball, and a resilient split diaphragm at the entrance to the upper chamber to yieldingly retain the ball in said chamber.

15. In apparatus for assembling valves in closure caps as claimed in claim 11, wherein the plunger remains in its actuated position subsequent to the insertion of a valve in a stopper to hold the leading valve in the magazine passage out of the exit of said magazine passage, and means to lift successive mandrels positioned in vertical alignment below the exit of the magazine passage while the plunger remains in the exit of the magazine passage and the lifting of the mandrel positioning the stopper in register with the exit of the magazine passage, subsequent to the positioning of the stopper in register with the exit of the magazine passage the plunger is yieldingly positioned out of said exit to have the leading valve enter the exit, subsequent to the entrance of the valve in the exit the plunger is actuated to insert the leading valve in the stopper in register with the exit of the magazine passage, and finally the lifting means lowers the mandrel with the valve inserted in the stopper with the plunger remaining in the exit of the magazine passage.

16. Apparatus for assembling valves in closure caps as claimed in claim 15, wherein the means to lift successive mandrels positioned in vertical alignment below the exit of the magazine passage comprises a second plunger reciprocally mounted below the path of travel of the mandrels in vertical alignment with the first plunger slidable in the magazine.

17. Apparatus for assembling valves in closure caps as claimed in claim 1, wherein the means to deliver successive closure caps in a horizontal plane above the path of travel of the mandrels comprises a hopper for the closure caps mounted in a horizontal plane higher than the path of travel of the mandrels and having a discharge, a chute declining from and communicating with the discharge of said hopper and the lower end portion of the chute extending in a horizontal plane above the path of travel of the tops of the mandrels, a pair of levers pivotally mounted at the upper ends on horizontal axis in vertical alingment with and above the opposite sides of the horizontal portion of the chute and having closure cap engaging portions extending in the horizontal plane of the horizontal portion of the chute and in front of said horizontal portion to engage and support the foremost closure cap as it leaves said horizontal portion of the chute, and a pair of stops secured to the opposite sides of the horizontal portion of the chute and extended in front of the horizontal portion of the chute to stop the forward movement of the foremost closure cap and retain said closure cap on the closure cap engaging portions of the levers.

18. Apparatus for assembling valves in closure caps as claimed in claim 17, wherein the levers are yieldingly urged toward each other to normally position the closure cap engaging portions in a horizontal plane and permit said closure cap engaging portions to be moved apart by the lifting movement of the mandrel and the insertion of the stopper into the closure cap.

19. In apparatus for assembling valves in closure caps as claimed in claim 17, a nozzle positioned above the path of travel of the closure caps in the chute and connected in communication with a source of fluid pressure to direct a jet or fluid pressure at the closure caps in the horizontal portion of the chute and propel said closure caps to the closure cap engaging portions of the levers.

20. Apparatus for assembling valves in closure caps as claimed in claim 1, wherein the means to lift successive mandrels and insert the stoppers supported by said mandrels into successive closure caps comprises a plunger reciprocally mounted below the path of travel of the mandrels in vertical alignment with the closure cap delivering means and actuated toward and away from successive mandrels to lift said mandrels toward successive closure caps supported by the closure cap delivering means, and a ramp succeeding said plunger in the direction of travel of the mandrels and having a horizontal surface extending in the plane of the top of the plunger in the uppermost position of the plunger and a surface declining from the horizontal surface to a horizontal plane extending below the bottoms of the mandrels in the lowermost position of the mandrels.

21. Apparatus for assembling valves in closure caps as claimed in claim 1, wherein the means to remove assembled closure caps from the mandrels comprises a channel member mounted to extend in a horizontal plane higher than the plane of travel of the assembled closure caps on the mandrels and having a receiving end and a discharge end, a plunger reciprocally mounted in a vertical plane in advance of the receiving end of the channel member and below the path of travel of the mandrels and actuated in an upward direction to lift successive mandrels to position the bottoms of the assembled closure caps in a horizontal plane higher that the bottom of the channel member, and a ramp succeeding said plunger in the direction of travel of the mandrels and having a horizontal surface substantially in the horizontal plane of the top of the plunger in its uppermost position and a surface declining from the horizontal surface to a horizontal plane below the horizontal plane of the bottoms of the mandrels in the lowermost position of said mandrels.

22. Apparatus for assembling valves in closure caps as claimed in claim 21, wherein the portion of the channel member at the receiving end comprises a pair of spaced parallel rails having inwardly extending flanges at the top and bottom, the flanges at the bottom supporting the closure caps and the upper flanges limiting vertical movement of the closure caps.

23. In apparatus for assembling valves in closure caps as claimed in claim 22, a bracket mounted on a side of the path of travel of the mandrels, an inverted U-shaped member secured to the bracket and connected to the portion of the channel member succeeding the receiving end of the channel member in the direction of travel of the mandrels, and said portion of the channel member comprises a plate secured to the leg portions of the U-shaped member and extended in a plane below the flanges at the bottom of the pair of spaced parallel rails and a grooved portion extending toward the discharge end of the channel member.

24. Apparatus for assembling valves in closure caps as claimed in claim 23, wherein the discharge end of the channel member comprises a pair of spaced parallel U-shaped rails mounted as continuations of the spaced parallel rails with the inner faces of the bottoms of the U facing each other, and a grooved member supported by the lowermost legs of the U-shaped rails and extended as a continuation of the grooved portion of the plate.

25. In means for delivering closure caps to articles, a chute having a closure cap receiving end and a closure cap discharge end, a pair of levers pivotally mounted at the upper ends on axes parallel to the closure cap discharge end of the chute and normally positioned perpendicularly to the horizontal axis of said discharge end of the chute and each lever having a portion extended from the lower end thereof toward each other substantially in the horizontal plane of the bottom of the discharge end of the chute with the extremities of said portions spaced from each other to engage and support the foremost closure cap as it leaves the discharge end of the chute, a pair of resilient members mounted on the discharge end of the chute and extended over the closure cap supporting portions to yieldingly retain said foremost closure cap on said closure cap supporting portions, means to transport and successively position articles between the extremities of the closure cap supporting portions, and means to lift an article past the closure cap supporting portions and into engagement with the foremost closure cap, and the transporting means removing the foremost closure cap with the engaged articles from the chute.

26. Means for delivering closure caps to articles as claimed in claim 25, wherein the levers abut the sides of the discharge end of the chute to position the levers parallel to each other and the closure cap supporting portions spaced from each other, and a spring connected at the opposite ends to the levers to yieldingly urge the levers into engagement with the sides of the chute.

27. In means for delivering closure caps to articles as claimed in claim 25, a nozzle mounted above the chute and connected in communication with a source of fluid pressure to direct a jet of fluid pressure toward the closure caps in the chute and advance said closuse caps toward the discharge end of the chute.

28. Means for delivering closure caps to articles as claimed in claim 25, wherein the pair of resilient members are mounted to extend at converging angles toward the path of travel of the closure caps in the chute.

29. Means for delivering closure caps to articles as claimed in claim 25, wherein the means to lift an article comprises a plunger reciprocally mounted below the path of travel of the articles and actuated toward and away from an article in vertical alignment with the closure cap supported by the closure cap supporting portions, and a ramp extending from the plunger in the direction of travel of the articles and having a horizontal surface extending in the horizontal plane of the top of the plunger in the uppermost position of the plunger and a surface declining from the horizontal surface.

No references cited.

FRANK E. BAILEY, *Primary Examiner.*